United States Patent [19]

Högenhout et al.

[11] Patent Number: 4,472,216
[45] Date of Patent: Sep. 18, 1984

[54] METHOD OF MAKING A SHORT PULSE CABLE FOR ELECTRICAL POWER TRANSMISSION

[75] Inventors: Franciscus Högenhout, Redmond; Arthur W. McDermott, Maple Valley; Joseph L. Rumney, Seattle, all of Wash.

[73] Assignee: The Boeing Company, Seattle, Wash.

[21] Appl. No.: 494,153

[22] Filed: May 13, 1983

Related U.S. Application Data

[62] Division of Ser. No. 268,929, Jun. 1, 1981, Pat. No. 4,423,620.

[51] Int. Cl.³ .......................................... H01B 13/22
[52] U.S. Cl. ........................................ 156/50; 29/854; 29/857; 156/53; 156/56; 174/106 R; 174/109
[58] Field of Search ............... 29/828, 868, 854, 857, 29/861; 156/53, 56, 50; 174/106 R, 109; 228/256

[56] References Cited

U.S. PATENT DOCUMENTS 2,374,514  4/1945  Vincent .......................... 156/56 X
2,691,694  10/1954  Young ............................ 156/56 X
4,200,126  4/1980  Fish .............................. 174/109 X Primary Examiner—Robert A. Dawson
Attorney, Agent, or Firm—Conrad O. Gardner; Bernard A. Donahue

[57] ABSTRACT

A flexible lightweight short pulse power cable assembly for electrical power transmission, e.g., for transmission of electrical power at 20,000 volts at short pulse D.C. halfwave currents of 30,000 amperes. The cable for electrical transmission utilizes an inner conductor and an outer concentrically disposed conductor, the inner and outer conductors having substantially equal cross-sectional areas and consequent resistances to equal and opposite current flows in the respective conductors thereby placing the cable current forces in compressive balance and further reducing electro-magnetic interference from transmission of power through the cable.

1 Claim, 6 Drawing Figures

INNER TERMINALS
OUTER TERMINALS

CAPACITOR END
PULSE COIL END

EMR POWER SUPPLY
CAPACITOR
GROUND BLOCK
EMR GUNS WITH PULSE COIL
SHORT PULSE POWER CABLES

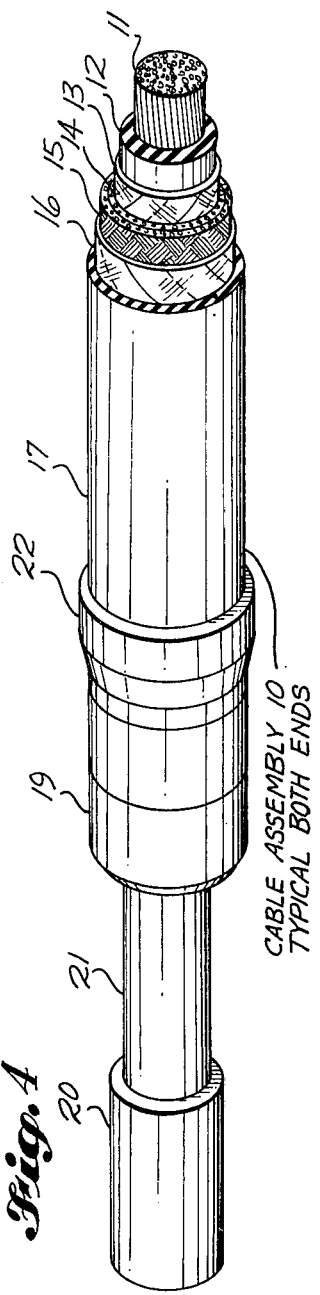
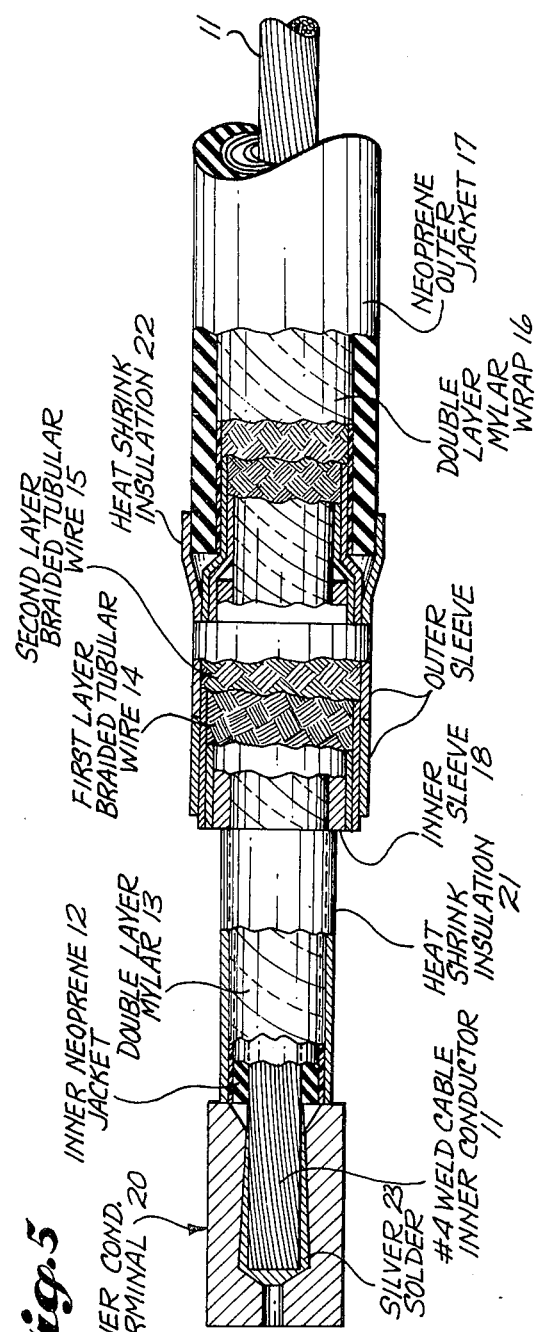

METHOD OF MAKING A SHORT PULSE CABLE FOR ELECTRICAL POWER TRANSMISSION

This is a division, of application Ser. No. 268,929, filed June 1, 1981, now U.S. Pat. No. 4,423,620.

This invention relates to electrical short pulse power transmission cables and more particularly lightweight short pulse flexible power cables for utilization in electromagnetic riveter and dent remover systems, and the method of making such cables.

Exemplary of prior art short pulse power cables and the method of making thereof gives U.S. Pat. No. 3,811,313 to Schut, also assigned to The Boeing Company. Short pulse power cables as shown in U.S. Pat. No. 3,811,313 can be seen to include four or more conductor cables wherein each conductor cable utilized is a state-of-the-art type radio frequency (RF) coaxial-type cable. Each of these RF-type coaxial cables is known to have an inner and outer conductor terminal but does not provide equal current carrying capacity between inner and outer conductor portions of the RF coaxial cable. In short pulse power cable applications such as in electro-magnetic riveters as shown in U.S. Pat. No. 3,811,313, it has as a consequence become necessary to use a plurality, e.g., four or more coaxial-type cables in order that the load current required to be carried was divided between the plurality of RF-type coaxial cables to lower the total impedance and provide the necessary power transfer from power supply to electro-magnetic riveter. Such grouping of electical radio frequency type coaxial cables are then encased in an outer conduit to provide sufficient insulation protection. In such prior art grouping of RF-type coaxial cables, single termination of each of the inner and outer conductor terminals was then required to be made to related equipment.

As a consequence, it is an object of this invention to provide a short pulse, high current, high voltage power cable capable of withstanding a potential of 20,00 volts, and carrying a short pulse D.C. halfwave current of 30,000 amps.

It is a further object of the present invention to provide a short pulse power cable having concentrically disposed inner and outer conductors wherein the resistance along a given length of the cable is equal along inner and outer conductors thereby causing equal and opposite current flows within the cable along the inner and outer conductors so that electro-magnetic fields generated by the opposite current flowing within the cable places the physical forces in compressive balance thereby resulting in physical integrity of the cable under high current applications.

It is a further object of the present invention to provide a coaxial cable having inner and outer conductors of substantially equal cross-sectional area and consequent conductivity thereby reducing electo-magnetic interference due to currents flowing within the cable.

It is yet another object of the present invention to provide a coaxial-type cable for short pulse, high power applications wherein equal and opposite currents flow within the inner and outer conductors of the coaxial cable.

It is another object of the present invention to provide a coaxial cable having a capacity for carrying short pulse D.C. halfwave currents of 30,000 amperes at a potential of 20,000 volts and having single terminal terminations for the inner and outer conductors on the supply and utilization ends of the coaxial cable.

Other features and objects of the present invention will become more apparent from the reading of the following detailed description when read with the accompanying drawings in which:

FIG. 1 is illustrative of the prior cable assembly utilizing a multi-conductor RF-type coaxial cable arrangement such as shown in FIG. 18 of U.S. Pat. No. 3,811,313;

FIG. 4 is a perspective view of an end portion of a section of short pulse power cable in accordance with a preferred embodiment of the present invention further showing end termination;

FIG. 5 is a detailed cutaway view of the short pulse power cable of FIG. 4 showing in more detail the cable structure; and, FIG. 6 is a perspective view showing connections of the present short pulse power cable to a pulse coil having end strap terminations.

Figure 1:
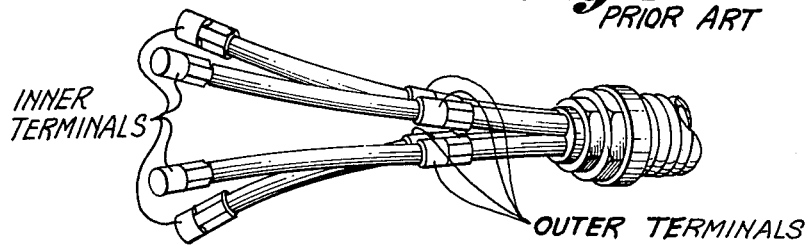
Figure 2:
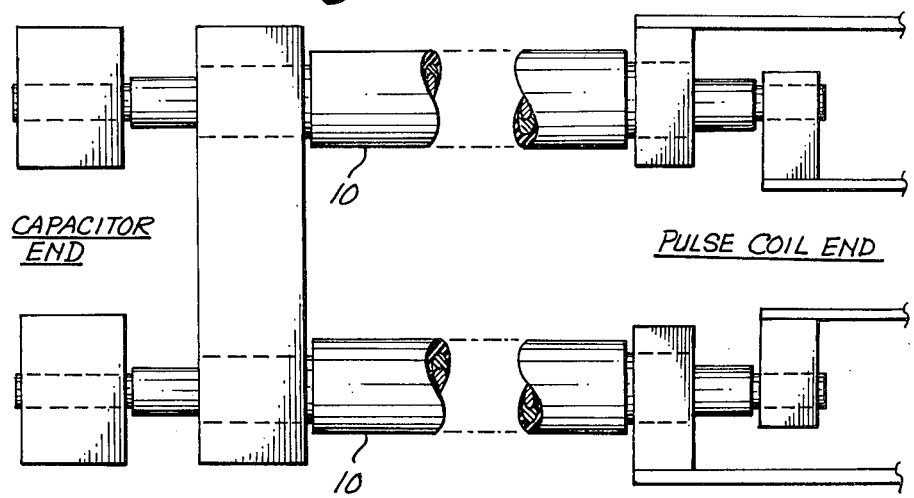
FIG. 2 is a schematic block diagram showing how a pair of short pulse power cable sections in accordance with the preferred embodiment of the present invention are connected between the capacitor portion of a power supply and the pulse coil end of electro-magnetic riveting apparatus.

Turning now to FIG. 1 and further making reference to FIG. 18 of U.S. Pat. No. 3,811,313, it can readily be seen that a plurality of individual RF-type coaxial cables were utilized in order to obtain capacity for the current load required by coils of electro-magnetic riveter apparatus. It can further be seen that a group of such multiple coaxial cables which were required to provide sufficient current load carrying capacity also required that the plurality of inner terminals at the ends of the respective cables had to be connected together to provide a termination and the outer terminals also required a terminating device to make proper electrical contact with the several terminals without introducing substantial resistance in the terminating means. In contrast, as seen in FIG. 2, utilization of a pair of coaxial cables 10 in accordance with preferred embodiments of the present invention are sufficient to complete the electrical circuit between the pulse coil end of an electro-magnetic riveting system and the capacitor end at the power supply of an electro-magnetic riveter system.

Figure 3:
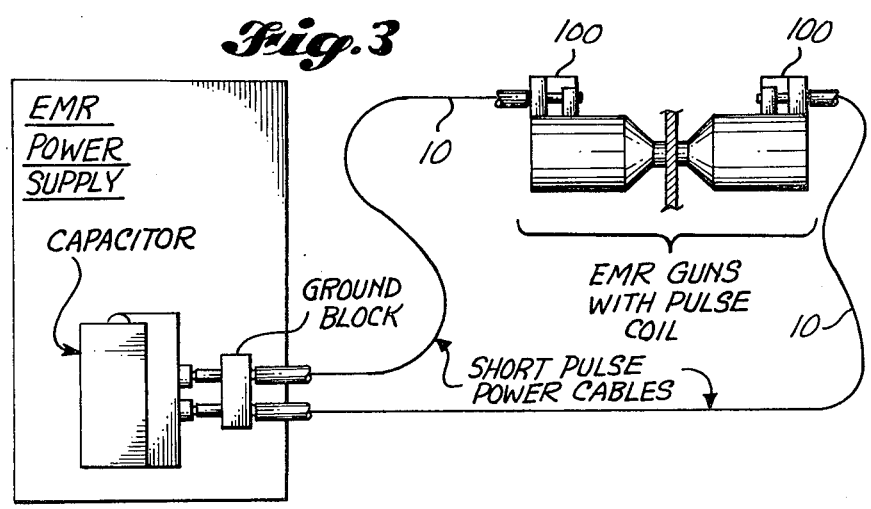
FIG. 3 is a schematic diagram of a system utilizing cable connections as shown in FIG. 2, however showing in more detail the power supply and electro-magnetic riveting gun apparatus as utilized in such a system.

In FIG. 3, it can be seen that a single pair of short pulse power cables 10 require only a single terminating means 100 on each of the opposed electro-magnetic riveting guns, more particularly to the coil terminals of the electro-magnetic riveting guns. Coil terminating means 100 is shown in more detail and described hereinafter in connection with FIG. 6. The several advantages of the present coaxial cable power transmission structure 10 will be seen hereinafter in connection with the descriptions of FIGS. 4 and 5 showing detailed structural assembly of cable 10. However, an immediate comparison may be made with FIG. 1 where a multiple coaxial cable assembly was necessary for transmission in each of the power packs between EMR guns and power supply which further required complex, low resistance connecting means at the ends of the inner and outer terminals of the respective plurality of cables.

Turning now to FIG. 1, it can be seen that the prior art power cables (as seen also in more detail in FIG. 18 of U.S. Pat. No. 3,811,313 to Schut) in order to transfer the amounts of power required from electro-magnetic riveting power supplies to electro-magnetic riveting guns have utilized a plurality of RF-type coaxial cables. As seen in FIG. 1, the utilization of a plurality of RF-type coaxial cables to handle the total current load further required that the plurality of inner and outer terminations of the cable utilize a rather complex mechanical connector assembly for connecting the plurality of coaxial cables to the pulse coil of the eletro-magnetic gun. As seen in FIG. 2, the present embodiment of electrical power transmission cable 10 permits less hardware utilization in making coupling between the cable 10 and the pulse coil and of the EMR gun. The actual connector means denoted by the numeral 100 in FIG. 6 will be described in more detail hereinafter. It can be seen now with reference to FIG. 3 that the present invention provides an electrical power transmission cable 10 coaxially structured as hereinafter described which permits simple connections of the lightweight flexible electrical power transmission cable 10 to be made between EMR guns and the EMR power supply.

Figure 6:
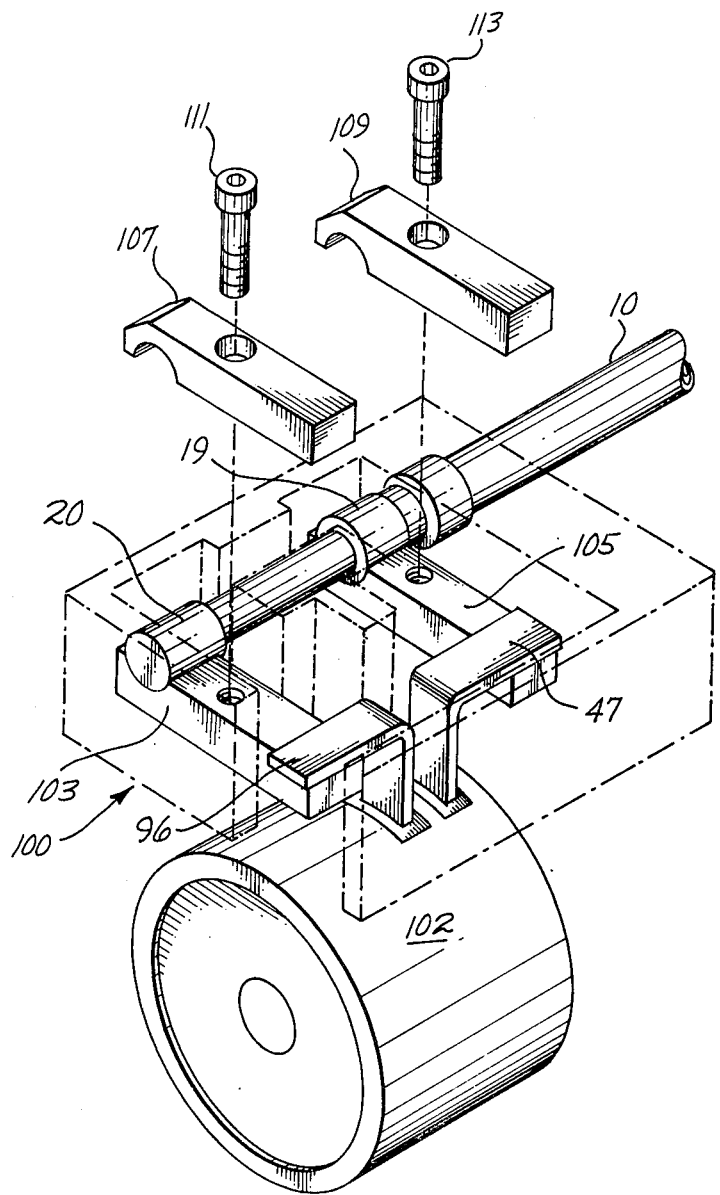

Turning now to FIGS. 4 and 5 for a general overview of several important features of the present short pulse power cable assembly 10, it will be noted that cable assembly 10 comprises an inner conductor 11 and concentrically disposed outer conductors 14 and 15, outer concentric conductors 14 and 15 having a total resistance per unit length substantially equal to the resistance per unit length of inner conductor 11 due to substantially equal cross-sectional area of the respective inner and outer conductors as hereinafter described in more detail. It should also be noted that cable assembly 10 at the end thereof requires only a single termination 20 for inner conductor 11 and a single outer termination 19 for outer conductors 14 and 15 thereby providing simplified coupling to be utilization device, e.g. an EMR coil as seen in FIG. 6. The utilization of a single integral cable assembly 10 instead of a plurality of individual coaxial cables as shown in the prior art in FIG. 1 permits light weight and flexibility in the power cable assembly, an important feature necessary for manipulation of equipment such as EMR guns particularly when the length of cable run requires substantial manipulation of the cable assembly and various positionings of the utilization device such as an EMR gun on the end of the cable assembly.

Further important features of the present cable assembly 10: comprise the combined utilization of inner Neoprene (a synthetic rubber-like electrically insulating material) jacketing 12 coaxially disposed and surrounding inner conductor 11 (jacketing 12 coaxially disposed about inner conductor 11 obtainable from the Bronco Company, a Division of the Teledyne Company and identified as Bronco #66); inner double-layered Mylar (a poly (ethelyn terephthalate) plastic film manufactured in tape form by the DuPont Company of Wilmington, Del.) wrap 13 wound circumferentially about and coaxially with inner Neoprene jacketing 12; together with outer Neoprene jacket 17 disposed coaxially about outer double-layered Mylar wrap 16 thereby providing dielectric insulation between inner conductor 11 and outer conductors 14 and 15 capable of withstanding a potential of 20,000 volts with short pulse D.C. halfwave currents of 30,000 amperes flowing through the cable assembly. Such combined insulation features at the same time provide a dielectric insulation shield having a substantial outer wear surface capability.

The above brief description of the cable assembly structure 10 shown in FIGS. 4 and 5 when assembled as described in the step by step procedure hereinafter under the present specification title "Pulse Power Cable Assembly 10 Fabrication Procedure" yields a short pulse power cable having the advantageous electrical characteristics hereinabove described while providing light weight and flexibility unobtainable in the utilization of the prior art power cable assembly shown in FIG. 1.

Pulse Power Cable Assembly 10 Fabrication Procedure

The step by step fabricating procedure for making cable assembly 10 included:

Preparing the required length of inner conductor 11 comprising #4 copper weld cable having an area of about 41,740 circular mils with coaxially disposed covering 12 about the inner conductor 11, the covering 12 comprising the hereinbefore mentioned Neoprene covering. The outer circumference of inner conductor jacketing 12 is then wrapped with two layers of one mil thick 1-inch wide Mylar tape 13 with a 50% overlap. Subsequently, two layers of tubular wire braid forming outer conductors 14 and 15 each of tubular wire braids 14 and 15 having 864 wires of #36 gage tinned copper wire providing a total copper wire cross-sectional area of 43,200 circular mils was then disposed over insulative poly (ethelyn terephthalate) tape 13. The aforementioned tubular wire braid 14 and 15 is available as Part No. 300-44 from Standard Wire and Cable Company of Vancouver, Wash.

A further two-layer winding of Mylar tape 16 is wound with the same overlap as Mylar tape 13 over tubular wire braid outer conductors 14 and 15. An outer Neoprene jacket 17 is then blown over the outer layers of Mylar tape 16. Outer Neoprene jacket 17 comprises 9/16 ID×⅛ W type GR60 manufactured by the Huntington Rubber Company of Portland, Ore.

Upon completion of the installation of the outer Neoprene jacketing 17, the jacketing is trimmed back to a point adjacent to the position of outer termination sleeve 19, outer Mylar wrap 16 also being unwrapped to this point on the cable assembly. Outer conductor tubular braids 14 and 15 are then trimmed to the desired point of the outer termination. Inner sleeve 18 is then placed under tubular wire braids 14 and 15, and outer sleeve 19 is placed over tubular wire braids 14 and 15 and then swaged together with a minimum of 6000 lb/sq.in. force. Inner sleeve 18 comprises 0.60 O.D.×0.53 ID×1.13 long type 321 stainless steel, outer sleeve 19 of stainless steel utilized was Part No. 710 manufactured by the Burndy Corporation of Norwalk, Conn. Outer Mylar wrap 16 is then rewrapped to butt outer termination sleeve 19. Heat shrink insulation 22 is then positioned over Mylar wrap 16 and the forward end of outer Neoprene jacket 17 which is a heat shrink insulation material identified as Raychem Part. #NT-7/8 manufactured by Raychem Corporation of Menlo Park, Calif.

At this point in the method of manufacture of cable assembly 10, inner Mylar wrap 13 is unwrapped, and both inner Neoprene jacket 12 and inner conductor 11 are trimmed back to the desired location of inner conductor terminal 20. Inner conductor terminal 20 is then placed over inner conductor 11 and soldered (identified at numeral 23) in place utilizing solder identified as Easy-Flo #45 manufactured by Handy Harmon Company of New York, N.Y. Inner Mylar wrap 13 is then rewrapped to butt inner conductor terminal 20. Heat shrink insulation 21 is then placed over Mylar wrap 13 to cover area between inner conductor terminal 20 and outer conductor sleeve 19. Heat shrink insulation 21 utilized was identified as Raychem Part #NT-5/8 manufactured by Raychem Corporation of Menlo Park, Calif. The fabrication process was utilized to manufacture cables of various lengths with terminal conductor spacings between terminal conductors 19 and 20 being varied as required in the particular application for connection to utilization devices and power supplies.

Turning now to FIG. 6, an exploded view of the cable connector assembly 100 shows the manner of coupling cable assembly 10 to electro-magnetic riveting coil 102. Coil terminal leads 96 and 97 which are flat shaped and of rectangular cross-section are coupled respectively to inner termination 20 and outer termination 19 of cable assembly 10 through mechanical connector assembly 100. A single bus bar 103 supported in mechanical connector assembly 100 which is made of highly conductive material having good mechanical properties such as brass or beryllium copper provides seating for upturned flat quill terminal 96 and (by means of a recess) inner conductor terminal 20. On the other side of mechanical connector assembly 10 bus bar 105 similarly provides support and electrical conduction of the aforementioned heavy currents between flat quill terminal 97 and outer sleeve terminal 19 of cable assembly 10. A pair of suitable clamping bars 107 and 109 are superimposed respectively overlying inner conductor terminal 20 and quill terminal 96 and outer sleeve terminal 19 and quill terminal 97, suitably being drawn under compressive forces towards bus bars 103 and 105 respectively by a fastening means such as screws 111 and 113. It will be readily recognized that only a single pair of contact resistances between cable assembly 10 terminals 19 and 20 to bus bars 103 and 105 are required in comparision to the several contact resistances developed in the current flow path to the utilization device such as the EMR coil by the plurality of terminals of the prior art cable assembly shown in FIG. 1.

What is claimed is:

1. The method of making a short pulse power cable comprising the steps of:

providing an inner conductor (11) having a first predetermined cross-sectional area and including a surrounding insulating jacket;

spirally wrapping said inner conductor with double layers of plastic tape with about 50% overlap;

providing an outer conductor of tubular wire braid concentrically disposed about said spirally wrapped inner conductor;

spirally wrapping said outer conductor with double layers of plastic tape with about 50% overlap; then, providing an outer jacket over said spirally wrapped outer conductor;

trimming back said outer jacket and said tubular wire braid to a predetermined point on said outer conductor;

placing an inner sleeve (18) under said tubular wire braids (14, 15);

placing an outer sleeve (19) over said tubular wire braids (14, 15);

swaging inner sleeve (18) and outer sleeve (19) together;

trimming back said inner conductor (11) to a further predetermined length; and then, soldering an inner conductor terminal (20) to said inner conductor (11).

* * * * *